(12) United States Patent
Mae et al.

(10) Patent No.: US 11,702,570 B2
(45) Date of Patent: Jul. 18, 2023

(54) POLISHING COMPOSITION

(71) Applicant: FUJIMI INCORPORATED, Kiyosu (JP)

(72) Inventors: Ryota Mae, Kiyosu (JP); Tsutomu Yoshino, Kiyosu (JP); Shogo Onishi, Kiyosu (JP); Hirofumi Ikawa, Kiyosu (JP); Yasuto Ishida, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

(21) Appl. No.: 16/797,177

(22) Filed: Feb. 21, 2020

(65) Prior Publication Data
US 2020/0308449 A1    Oct. 1, 2020

(30) Foreign Application Priority Data

Mar. 27, 2019   (JP) ................................ 2019-061627
Sep. 30, 2019   (JP) ................................ 2019-178322

(51) Int. Cl.
*C09G 1/02*   (2006.01)
(52) U.S. Cl.
CPC ..................................... *C09G 1/02* (2013.01)
(58) Field of Classification Search
None
See application file for complete search history.

(56) References Cited

U.S. PATENT DOCUMENTS

| | | | | |
|---|---|---|---|---|
| 2018/0312725 A1* | 11/2018 | Sugita | ............... | H01L 21/02024 |
| 2019/0203027 A1 | 7/2019 | Chen | | |
| 2020/0299543 A1 | 9/2020 | Ishida | | |
| 2021/0139739 A1 | 5/2021 | Yoshizaki et al. | | |

FOREIGN PATENT DOCUMENTS

| | | | |
|---|---|---|---|
| JP | 2004-273502 A | | 9/2004 |
| JP | 2017011220 A | * | 1/2017 |
| JP | 2018074048 A | * | 5/2018 |
| TW | 2017-38338 A | | 11/2017 |
| TW | 201814034 A | | 4/2018 |
| TW | 201839087 A | | 11/2018 |
| WO | WO-2017/163910 A1 | | 9/2017 |
| WO | WO-2018/055941 A1 | | 3/2018 |
| WO | WO-2018/168206 A1 | | 9/2018 |
| WO | WO-2018/216733 A1 | | 11/2018 |

OTHER PUBLICATIONS

Written Notice of Reasons for Refusal dated Mar. 29, 2022 issued in CN Application No. 202010205880.1, with English translation, 18 pages.
SG Office Action on SG Appl. Ser. No. 10202001434R dated Jan. 4, 2023 (10 pages).
Second Office Action dated Aug. 22, 2022 issued in corresponding Chinese Application No. 202010205880.1 with English translation (9 pages).
Office Action issued in corresponding Japanese Patent Application No. 2019-178322, dated Jan. 31, 2023 with English Machine Translation (6 pages).

* cited by examiner

*Primary Examiner* — Roberts P Culbert
(74) *Attorney, Agent, or Firm* — Foley & Lardner LLP

(57) ABSTRACT

An object of the present invention is to provide a new polishing composition that contributes to improving the quality of a device.
There is provided a polishing composition containing: an abrasive grain having an organic acid immobilized on a surface thereof; a first water-soluble polymer having a sulfonic acid group or a group having a salt thereof, or a carboxyl group or a group having a salt thereof; a second water-soluble polymer different from the first water-soluble polymer; a nonionic surfactant; and an aqueous carrier, wherein the polishing composition is used for polishing an object to be polished.

23 Claims, No Drawings

POLISHING COMPOSITION

BACKGROUND

1. Technical Field

The present invention relates to a polishing composition.

2. Description of Related Arts

With high-level integration resulting from the miniaturization of an LSI production process, electronic devices such as computers have been decreased in size and improved in performance such as multiple functions, high speed, and the like. In new fine processing technologies according to such high-level integration of LSI, a chemical mechanical polishing (CMP) method is used. The CMP method is a technology that is frequently used in flattening of an interlayer insulating film, formation of a metal plug, and formation of embedded wiring (damascene wiring) in the LSI production process, particularly, in a multilayer wiring forming process.

In general, formation of a metal plug or wiring in a semiconductor device is performed by forming a conductor layer formed of a metal on a film such as a silicon oxide film, a silicon nitride film, a polysilicon film, or the like in which a recess is formed, and then removing a part of the conductor layer by polishing until the film is exposed. This polishing process is divided broadly into a main (bulk) polishing step of performing polishing for removing the most part of an object to be removed and a buff polishing step of performing finish polishing on an object (for example, Patent Literature 1).

CITATION LIST

Patent Literature

Patent Literature 1: JP-A-2004-273502

SUMMARY

In recent years, a thickness of the film has been reduced, and the present inventors found that in a process in which only a bulk polishing step and a buff polishing step are performed using a general polishing composition, the quality of the finally produced device may not be sufficient. Therefore, in order to solve the problems, an object of the present invention is to provide a new polishing composition that contributes to improving the quality of a device which is a final product.

The present inventors have conducted intensive studies in order to solve the above-described problems. As a result, the present inventors found that the problems can be solved by providing a polishing composition containing an abrasive grain having an organic acid immobilized on a surface thereof, a first water-soluble polymer having a sulfonic acid group or a group having a salt thereof, or a carboxyl group or a group having a salt thereof, a second water-soluble polymer different from the first water-soluble polymer, a nonionic surfactant, and an aqueous carrier, wherein the polishing composition is used for polishing an object to be polished.

The polishing composition of the present invention contributes to improving the quality of a device which is a final product.

DETAILED DESCRIPTION

Hereinafter, the present invention will be described. It should be noted that the present invention is not limited to only the following embodiments. In addition, unless otherwise specified, an operation and a measurement of physical properties and the like are carried out under a condition of room temperature (20 to 25° C.)/relative humidity of 40 to 50% RH.

The present invention provides a polishing composition containing an abrasive grain having an organic acid immobilized on a surface thereof, a first water-soluble polymer having a sulfonic acid group or a group having a salt thereof, or a carboxyl group or a group having a salt thereof, a second water-soluble polymer different from the first water-soluble polymer, a nonionic surfactant, and an aqueous carrier, wherein the polishing composition is used for polishing an object to be polished. Such a polishing composition contributes to improving the quality of a device which is a final product.

[Device Production Process]

In an embodiment of the present invention, a device is a semiconductor device. In an embodiment of the present invention, an object to be polished is formed on a substrate (for example, a silicon wafer) in a film form. The object to be polished is not limited, but is an object to be polished containing a Si-based material, for example, a silicon-silicon bond, a nitrogen-silicon bond, an oxygen-silicon bond, or the like. According to such an embodiment, there are technical effects that a roughness can be eliminated by performing polishing in advance, and a processing time and steps in the subsequent process can be reduced.

In the present embodiment, examples of an object to be polished containing a silicon-oxygen bond include a silicon oxide film, black diamond (BD) (SiOCH), SiOC, fluorosilicate glass (FSG), hydrogen silsesquioxane (HSQ), CYCLOTENE, SiLK, methyl silsesquioxane (MSQ), and the like. Examples of an object to be polished containing a silicon-silicon bond include polysilicon, amorphous silicon, single-crystalline silicon, n-type doped single-crystalline silicon, p-type doped single-crystalline silicon, phosphorus doped polysilicon, boron doped polysilicon, a Si-based alloy such as SiGe, and the like. Examples of an object to be polished containing a silicon-nitrogen bond include a silicon nitride film, silicon carbonitride (SiCN), and the like.

According to another embodiment of the present invention, an object to be polished is carbon, dry film resist (DFR), SiC, and the like.

In an embodiment of the present invention, a device production process includes a bulk polishing step and a buff polishing step. In an embodiment of the present invention, the device production process includes a preliminary polishing step, a bulk polishing step, and a buff polishing step. A step of forming an object to be polished in a film form can be included before, after, or before and after these polishing steps. In the present embodiment, the preliminary polishing step is performed prior to the bulk polishing step for removing the most part of the object to be polished, such that an influence on the final device due to a surface roughness of a substrate or the object to be polished can be minimized. In addition, since the number of defects in the device can be significantly reduced, the reliability of the device which is the final product is improved. Further, a roughness can be eliminated by performing polishing in advance, and a processing time and steps in the subsequent process can be reduced.

In an embodiment of the present invention, a film thickness of the object to be polished is not particularly limited. In an embodiment of the present invention, a method for forming an object to be polished in a film form is not particularly limited, and known film forming technologies such as ALD, CVD, PVD, and the like can be applied. In order to efficiently reduce the film thickness of the object to be polished, it is preferable to use ALD, but it is a matter of course that the present invention is not limited thereto.

In an embodiment of the present invention, the polishing composition can be used for polishing an object to be polished in any steps, but is preferably used for polishing an object to be polished in the preliminary polishing step. According to such an embodiment, an influence on the final device due to the surface roughness can be minimized. In addition, since the number of defects in the device can be significantly reduced, the reliability of the device which is the final product is improved. Further, a roughness can be eliminated by performing polishing in advance, and a processing time and steps in the subsequent process can be reduced. Accordingly, in an embodiment of the present invention, there is provided a process of producing a semiconductor device, the process including a preliminary polishing step, a bulk polishing step, and a buff polishing step, in which the polishing composition according to an embodiment of the present invention is used as a polishing composition in the preliminary polishing step. According to such an embodiment, an influence on the final device due to the surface roughness can be minimized. In addition, since the number of defects in the device can be significantly reduced, the reliability of the device which is the final product is improved. In an embodiment of the present invention, compositions of the polishing compositions used in the preliminary polishing step, the bulk polishing step, and the buff polishing step may be different from each other. That is, all of the composition of the polishing composition in the preliminary polishing step, the composition of the polishing composition in the bulk polishing step, and the composition of the buff polishing step may be different from each other.

[Polishing Method]

In an embodiment of the present invention, there is provided a method of polishing an object to be polished, the method including polishing an object to be polished using a polishing composition. According to such a polishing method, the quality of the device which is the final product is improved. In an embodiment of the present invention, a method of rotating a polishing composition while pouring the polishing composition to be flowed by pressing a pad against the object to be polished using a polishing apparatus, and the like are exemplified.

As the polishing apparatus, it is possible to use a general polishing apparatus equipped with a holder for holding the object to be polished and the like, a motor capable of changing a rotation speed, and the like, and having a platen to which a pad may be attached. As the pad, it is possible to use general nonwoven fabric, polyurethane, a porous fluororesin, and the like without particular limitation.

In an embodiment of the present invention, it is preferable that polishing conditions in the preliminary polishing step, the bulk polishing step, and the buff polishing step be appropriately set.

In the present embodiment, an upper limit of a pressure between the object to be polished and the pad in the preliminary polishing step is preferably less than 3 psi, more preferably less than 2 psi, still more preferably 1.6 psi or less, and yet still more preferably less than 1.5 psi. In the present embodiment, a lower limit of the pressure between the object to be polished and the pad in the preliminary polishing step is preferably 0.1 psi or more, more preferably 0.3 psi or more, and still more preferably 0.5 psi or more. In the present embodiment, an upper limit of a rotation speed of a head (carrier) in the preliminary polishing step is preferably less than 120 rpm, more preferably less than 100 rpm, and still more preferably less than 80 rpm. In the present embodiment, a lower limit of the rotation speed of the head in the preliminary polishing step is preferably 50 rpm or more, more preferably 60 rpm or more, and still more preferably 70 rpm or more. In the present embodiment, an upper limit of a rotation speed of a table in the preliminary polishing step is preferably less than 120 rpm, more preferably less than 100 rpm, and still more preferably less than 90 rpm. In the present embodiment, a lower limit of the rotation speed of the table in the preliminary polishing step is preferably 50 rpm or more, more preferably 60 rpm or more, and still more preferably 70 rpm or more. A supply amount of pouring and flowing processing in the preliminary polishing step is not limited, but it is preferable that a surface of the object to be polished be covered with the polishing composition, and for example, the supply amount is 50 to 300 ml/min. In addition, a polishing time is not particularly limited, but is preferably 5 to 60 seconds.

In the present embodiment, an upper limit of a pressure between the object to be polished and the pad in the bulk polishing step is preferably less than 10 psi, more preferably less than 7 psi, and still more preferably less than 5 psi. In the present embodiment, a lower limit of the pressure between the object to be polished and the pad in the bulk polishing step is preferably 1 psi or more, more preferably 1.5 psi or more, still more preferably 1.6 psi or more, still more preferably 2 psi or more, and yet still more preferably psi or more. In the present embodiment, an upper limit of a rotation speed of a head in the bulk polishing step is preferably less than 130 rpm, more preferably less than 120 rpm, and still more preferably less than 110 rpm. In the present embodiment, a lower limit of the rotation speed of the head in the bulk polishing step is preferably 80 rpm or more, more preferably 90 rpm or more, and still more preferably 100 rpm or more. In the present embodiment, an upper limit of a rotation speed of a table in the bulk polishing step is preferably less than 140 rpm, more preferably less than 130 rpm, and still more preferably less than 120 rpm. In the present embodiment, a lower limit of the rotation speed of the table in the bulk polishing step is preferably 80 rpm or more, more preferably 90 rpm or more, and still more preferably 100 rpm or more. A supply amount of pouring and flowing processing in the bulk polishing step is not limited, but it is preferable that a surface of the object to be polished be covered with the polishing composition, and for example, the supply amount is 50 to 300 ml/min. In addition, a polishing time is not particularly limited, but is preferably 30 to 120 seconds.

In the present embodiment, an upper limit of a pressure between the object to be polished and the pad in the buff polishing step is preferably less than 3 psi, more preferably less than 2 psi, still more preferably 1.6 psi or less, and still more preferably less than 1.5 psi. In the present embodiment, a lower limit of the pressure between the object to be polished and the pad in the buff polishing step is preferably 0.3 psi or more, more preferably 0.6 psi or more, and still more preferably 0.8 psi or more. In the present embodiment, an upper limit of a rotation speed of a head in the buff polishing step is preferably less than 100 rpm, more preferably less than 90 rpm, and still more preferably less than 80 rpm. In the present embodiment, a lower limit of the rotation speed of the head in the buff polishing step is preferably 50 rpm or more, more preferably 60 rpm or more, and still more preferably 70 rpm or more. In the present embodiment, an upper limit of a rotation speed of a table in the buff polishing step is preferably less than 120 rpm, more preferably less than 100 rpm, and still more preferably less than 90 rpm. In the present embodiment, a lower limit of the rotation speed of the table in the buff polishing step is preferably 60 rpm or more, more preferably 70 rpm or more, and still more preferably 80 rpm or more. A supply amount of pouring and flowing processing in the buff polishing step is not limited, but it is preferable that a surface of the object to be polished be covered with the polishing composition, and for example, the supply amount is 50 to 300 ml/min. In addition, a polishing time is not particularly limited, but is preferably 5 to 60 seconds.

In an embodiment of the present invention, (pressure between object to be polished and pad in preliminary polishing step)/(pressure between object to be polished and pad in bulk polishing step) is preferably less than 1.0, more preferably 0.75 or less, and still more preferably 0.5 or less. In an embodiment of the present invention, (pressure between object to be polished and pad in preliminary polishing step)/(pressure between object to be polished and pad in bulk polishing step) is preferably 0.15 or more, more preferably 0.20 or more, and still more preferably 0.25 or more.

In an embodiment of the present invention, (pressure between object to be polished and pad in buff polishing step)/(pressure between object to be polished and pad in bulk polishing step) is preferably less than 1.0, more preferably 0.75 or less, and still more preferably 0.5 or less. In an embodiment of the present invention, (pressure between object to be polished and pad in buff polishing step)/(pressure between object to be polished and pad in bulk polishing step) is preferably 0.15 or more, more preferably 0.20 or more, and still more preferably 0.2 or more.

In an embodiment of the present invention, (pressure between object to be polished and pad in buff polishing step)/(pressure between object to be polished and pad in preliminary polishing step) is preferably 3.0 or less, more preferably 2.5 or less, and still more preferably 2.0 or less. In an embodiment of the present invention, (pressure between object to be polished and pad in buff polishing step)/(pressure between object to be polished and pad in preliminary polishing step) is preferably 0.1 or more, more preferably 0.3 or more, and still more preferably 0.5 or more.

In an embodiment of the present invention, the preliminary polishing step is performed before the bulk polishing step, and the buff polishing step is performed after the bulk polishing step. In an embodiment of the present invention, at least one of a rinse polishing treatment and a cleaning treatment may be provided after the buff polishing step. As a composition for rinsing or a composition for cleaning, a conventionally known composition can be appropriately used.

[Polishing Composition]

In an embodiment of the present invention, the polishing composition contains an abrasive grain having an organic acid immobilized on a surface thereof, a first water-soluble polymer having a sulfonic acid group or a group having a salt thereof, or a carboxyl group or a group having a salt thereof, a second water-soluble polymer different from the first water-soluble polymer, a nonionic surfactant, and an aqueous carrier, and the polishing composition is used for polishing an object to be polished.

(Abrasive Grain Having Organic Acid Immobilized on Surface Thereof)

In an embodiment of the present invention, the polishing composition contains an abrasive grain having an organic acid immobilized on a surface thereof (in the present specification, simply referred to as "abrasive grain"). The abrasive grain contained in the polishing composition has an act of mechanically polishing the object to be polished.

In an embodiment of the present invention, specific examples of the abrasive grain include a particle formed of a metal oxide such as silica, alumina, zirconia, titania, or the like. The abrasive grain may be used alone or in combination of two or more kinds thereof. In addition, the abrasive grain may be a commercial product or may be a synthetic product. Among these abrasive grains, silica is preferable, fumed silica and colloidal silica are more preferable, and colloidal silica is particularly preferable. As a method for producing colloidal silica, a sodium silicate method and a sol-gel method are exemplified, and any colloidal silica produced by any production method is appropriately used as the abrasive grain of the present invention. However, colloidal silica produced by a sol-gel method which can produce colloidal silica with high purity is preferable.

In an embodiment of the present invention, the abrasive grain is an abrasive grain having an organic acid immobilized on a surface thereof. When the abrasive grain having an organic acid immobilized on a surface thereof is not used, a desired effect of the present invention cannot be achieved. In particular, in a case where a pH of the polishing composition is adjusted in an acidic range, when the abrasive grain having an organic acid immobilized on a surface thereof is not contained, the surface roughness of the object to be polished may deteriorate.

In an embodiment of the present invention, the organic acid is not particularly limited, but a sulfonic acid, a carboxylic acid, a phosphoric acid, and the like are exemplified, and a sulfonic acid is preferable. In addition, silica having an organic acid immobilized on a surface thereof is formed by immobilizing an acidic group derived from the organic acid (for example, a sulfo group, a carboxyl group, a phosphoric acid group, and the like) on the surface of the silica by a covalent bond (in some cases, via a linker structure). Here, the linker structure refers to any structure interposed between the surface of the silica and the organic acid. Accordingly, the silica having an organic acid immobilized on the surface thereof may be formed by immobilizing the acidic group derived from an organic acid on the surface of the silica by a direct covalent bond or may be formed by immobilizing the acidic group derived from an organic acid on the surface of the silica by a covalent bond through a linker structure. A method of introducing these organic acids on the surface of the silica is not particularly limited, and there is a method of introducing the organic acids in the state in which a protective group is bonded to the organic acid group to the surface of the silica and then eliminating the protective group, in addition to a method of introducing the organic acids in the state of having a mercapto group, an alkyl group or the like to the surface of the silica and then performing oxidization with a sulfonic acid or a carboxylic acid.

As a specific method for synthesizing silica having an organic acid immobilized on the surface thereof, it is possible to perform the synthesis, for example, by the method described in "Sulfonic acid-functionalized silica through quantitative oxidation of thiol groups", Chem. Commun. 246-247 (2003) when a sulfonic acid which is one kind of organic acids is immobilized on the surface of the silica.

Specifically, it is possible to obtain silica having a sulfonic acid immobilized on a surface thereof by coupling a silane coupling agent having a thiol group such as 3-mercaptopropyltrimethoxysilane or the like to silica and then oxidizing the thiol group with hydrogen peroxide. Colloidal silica having a sulfonic acid modified on a surface thereof according to the Examples of the present invention can also be similarly prepared.

When a carboxylic acid is immobilized on the surface of silica, it is possible to use the method described in "Novel Silane Coupling Agents Containing a Photo labile 2-Nitrobenzyl Ester for Introduction of a Carboxy Group on the Surface of Silica Gel", Chemistry Letters, 3, 228-229 (2000). Specifically, it is possible to obtain silica having a carboxylic acid immobilized on a surface thereof by coupling a silane coupling agent containing a photoreactive 2-nitrobenzyl ester to silica and then performing irradiation with light.

In an embodiment of the present invention, an average primary particle size of the abrasive grains is preferably 10 nm or more, more preferably 15 nm or more, still more preferably 20 nm or more, still more preferably 25 nm or more, and yet still more preferably nm or more. In the polishing composition of an embodiment of the present invention, an average primary particle size of the abrasive grains is preferably 60 nm or less, more preferably 50 nm or less, and still more preferably 40 nm or less. The abrasive grain has the average primary particle size, which is effective in reducing scratches and defects, and increasing a polishing speed. As the average primary particle size in the present invention, a value to be measured by a method described in Examples may be used.

In an embodiment of the present invention, an average secondary particle size of the abrasive grains is preferably 40 nm or more, more preferably 45 nm or more, still more preferably 50 nm or more, still more preferably 55 nm or more, still more preferably 60 nm or more, and yet still more preferably 65 nm or more. In an embodiment of the present invention, the average secondary particle size of the abrasive grains is preferably less than 100 nm, more preferably 90 nm or less, still more preferably 80 nm or less, and yet still more preferably 75 nm or less. The abrasive grain has the average secondary particle size, which is effective in increasing a polishing speed. As the average secondary particle size in the present invention, a value to be measured by a method described in Examples may be used. It should be noted that when the average secondary particle size of the abrasive grains is 100 nm or more, the dispersion stability of the abrasive grains may be degraded.

In an embodiment of the present invention, in a particle size distribution of the abrasive grains in the polishing composition that is obtained by a laser diffraction scattering method, a lower limit of a ratio of a diameter D90 of particles when a cumulative particle mass from fine particle side reaches 90% of the total mass of the entire particles to a diameter D10 of particles when the cumulative particle mass from the fine particle side reaches 10% of the total mass of the entire particles (in the present specification, simply referred to as "D90/D10") is preferably 1.3 or more, more preferably 1.4 or more, still more preferably 1.5 or more, and yet still more preferably 1.6 or more. The abrasive grain has the lower limit of the diameter ratio, which is effective in increasing the polishing speed. In an embodiment of the present invention, an upper limit of D90/D10 is preferably 4.0 or less, more preferably 3.5 or less, still more preferably 3.0 or less, and yet still more preferably 2.0 or less.

In an embodiment of the present invention, an aspect ratio of the abrasive grain is preferably 1.05 or more, more preferably 1.10 or more, and still more preferably 1.15 or more. Such an embodiment implements a technical effect of increasing the polishing speed. In an embodiment of the present invention, the aspect ratio of the abrasive grain is preferably 5 or less, more preferably 2 or less, and still more preferably 1.5 or less. Such an embodiment implements technical effects that the dispersion stability is improved and the number of defects is reduced. A measurement method of the aspect ratio of the abrasive grain follows the method described in Examples.

In an embodiment of the present invention, from the viewpoint of increasing the polishing speed and reducing the surface roughness after polishing, a content of the abrasive grain in the polishing composition is preferably more than 0.001% by mass, more preferably 0.005% by mass or more, still more preferably 0.01% by mass or more, still more preferably 0.05% by mass or more, still more preferably 0.1% by mass or more, still more preferably more than 0.01% by mass, and yet still more preferably 0.3% by mass or more, and may be 0.8% by mass or more, 1.2% by mass or more, 2% by mass or more, 3% by mass or more, and 4% by mass or more. In an embodiment of the present invention, from the viewpoint of reducing the scratches and reducing the number of defects, the content of the abrasive grain in the polishing composition is preferably 30% by mass or less, more preferably 20% by mass or less, still more preferably 15% by mass or less, still more preferably 10% by mass or less, and yet still more preferably 7% by mass or less, and may be 5% by mass or less, 4% by mass or less, 3% by mass or less, 2% by mass or less, 1% by mass or less, less than 1% by mass, 0.8% by mass or less, 0.7% by mass or less, and 0.6% by mass or less. In the present specification, when, for example, a content of a certain material is described, in a case where two or more materials are included, the content means a total amount of the two or more materials.

(First Water-Soluble Polymer)

In an embodiment of the present invention, the polishing composition contains a first water-soluble polymer. The first water-soluble polymer has a sulfonic acid group or a group having a salt thereof, or a carboxyl group or a group having a salt thereof.

In an embodiment of the present invention, the first water-soluble polymer has a benzene ring. In the present embodiment, the benzene ring may be incorporated in a main chain of the first water-soluble polymer, or may be incorporated in a form of a pendant group.

In an embodiment of the present invention, the first water-soluble polymer may contain a hetero atom in at least one of a main chain and a side chain thereof, but may not contain a hetero atom from a viewpoint of efficiently achieving a desired effect of the present invention. An example of the hetero atom includes at least one of an oxygen atom, a nitrogen atom, and a sulfur atom.

In an embodiment of the present invention, the first water-soluble polymer contains a constituent unit represented by the following Formula (1):

[Formula 1]

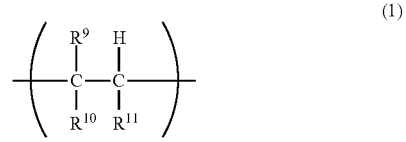

(1)

$R^9$ is a hydrogen atom or a methyl group, and $R^{10}$ and $R^{11}$ each independently are a hydrogen atom, —COOR$^{12}$, or -G, where $R^{10}$ and $R^{11}$ are not simultaneously hydrogen atoms, and -G is a sulfonic acid group,

[Formula 2]

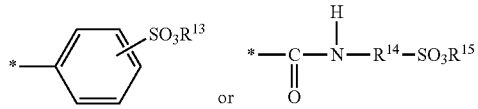

where * represents a bonding position, $R^{12}$, $R^{13}$, and $R^{15}$ each independently are a hydrogen atom, an alkyl group having 1 to 12 carbon atoms, a hydroxyalkyl group having 1 to 12 carbon atoms, or a counter cation, and $R^{14}$ is a divalent group. Such an embodiment can efficiently achieve a desired effect of the present invention. In the present specification, * represents a bonding position.

In an embodiment of the present invention, the first water-soluble polymer may contain two or more different constituent units each represented by Formula (1).

Here, the alkyl group having 1 to 12 carbon atoms may be linear or branched, and examples thereof include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a hexadecyl group, a stearyl group, an icosyl group, a docosyl group, a tetracosyl group, a triacontyl group, an isopropyl group, an isobutyl group, a tertiary butyl group, an isopentyl group, a neopentyl group, a tertiary pentyl group, an isoheptyl group, a 2-ethylhexyl group, an isodecyl group, and the like.

In addition, an example of the hydroxyalkyl group having 1 to 12 carbon atoms includes a group in which at least one hydrogen atom of the alkyl group having 1 to 12 carbon atoms is substituted with a hydroxyl group.

In addition, examples of the divalent group include an alkylene group having 1 to 12 carbon atoms, an arylene group having 6 to 24 carbon atoms, and the like. The alkylene group having 1 to 12 carbon atoms is a divalent substituent obtained by removing two hydrogen atoms from the alkyl group having 1 to 12 carbon atoms. Further, as the arylene group having 6 to 24 carbon atoms, a phenylene group, a naphthalenediyl group, or the like is suitable.

In addition, an example of the counter cation includes an ammonium ion, a sodium ion, or the like.

In an embodiment of the present invention, $R^9$ is a hydrogen atom or a methyl group, at least one of $R^{10}$ and $R^{11}$ is -G, -G is a sulfonic acid group or

[Formula 3]

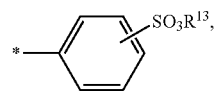

and $R^{13}$ is a hydrogen atom, an alkyl group having 1 to 12 carbon atoms, a hydroxyalkyl group having 1 to 12 carbon atoms, or a counter cation.

In an embodiment of the present invention, the first water-soluble polymer contains two or more different constituent units each represented by Formula (1), in one constituent unit, $R^9$ is a hydrogen atom or a methyl group, at least one of $R^{10}$ and $R^{11}$ is COOR$^{12}$, $R^{12}$ is a hydrogen atom or a counter cation, and in the other constituent unit, $R^9$ is a hydrogen atom or a methyl group, at least one of $R^{10}$ and $R^{11}$ is -G, -G is a sulfonic acid group or

[Formula 4]

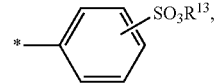

and $R^{13}$ is a hydrogen atom, an alkyl group having 1 to 12 carbon atoms, a hydroxyalkyl group having 1 to 12 carbon atoms, or a counter cation.

In an embodiment of the present invention, $R^9$ is a hydrogen atom or a methyl group, $R^{10}$ and $R^{11}$ are —COOR$^{12}$ and a hydrogen atom, respectively, and $R^{12}$ is a hydrogen atom or a counter cation. In this case, in particular, a pH is preferably less than 7.0 and more preferably less than 5.0.

In an embodiment of the present invention, the first water-soluble polymer contains a constituent unit in which $R^9$ is a hydrogen atom or a methyl group, $R^{10}$ and $R^{11}$ are —COOR$^{12}$ and a hydrogen atom, respectively, and $R^{12}$ is a hydrogen atom or a counter cation; and a constituent unit in which $R^9$ is a hydrogen atom or a methyl group, $R^{10}$ and $R^{11}$ are both —COOR$^{12}$, and $R^{12}$ is a hydrogen atom or a counter cation. In this case, the first water-soluble polymer may be in a form of an anhydride and it is better not to be in a form of an anhydride.

In an embodiment of the present invention, $R^9$ is a hydrogen atom or a methyl group, $R^{10}$ and $R^{11}$ are both —COOR$^{12}$, and $R^{12}$ is a hydrogen atom or a counter cation.

In an embodiment of the present invention, the first water-soluble polymer contains a constituent unit in which $R^9$ is a hydrogen atom or a methyl group, $R^{10}$ and $R^{11}$ are —COOR$^{12}$ and a hydrogen atom, respectively, and $R^{12}$ is a hydrogen atom or a counter cation; and a constituent unit in which $R^9$ is a hydrogen atom or a methyl group, at least one of $R^{10}$ and $R^{11}$ is —COOR$^{12}$, and $R^{12}$ is an alkyl group having 1 to 12 carbon atoms.

In an embodiment of the present invention, the first water-soluble polymer contains a constituent unit in which $R^9$ is a hydrogen atom or a methyl group, at least one of $R^{10}$ and $R^{11}$ is —COOR$^{12}$, and $R^{12}$ is a hydrogen atom or a counter cation; and a constituent unit in which $R^9$ is a hydrogen atom or a methyl group, at least one of $R^{10}$ and $R^{11}$ is -G, -G is

[Formula 5]

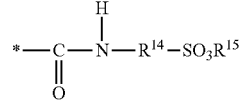

$R^{14}$ is a divalent group, and $R^{15}$ is a hydrogen atom, an alkyl group having 1 to 12 carbon atoms, a hydroxyalkyl group having 1 to 12 carbon atoms, or a counter cation.

In an embodiment of the present invention, $R^9$ is a hydrogen atom or a methyl group, at least one of $R^{10}$ and $R^{11}$ is -G, -G is

[Formula 6]

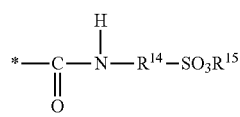

$R^{14}$ is a divalent group, and $R^{15}$ is a hydrogen atom, an alkyl group having 1 to 12 carbon atoms, a hydroxyalkyl group having 1 to 12 carbon atoms, or a counter cation.

In an embodiment of the present invention, the first water-soluble polymer is a copolymer of a sulfonic acid and a carboxylic acid (referred to as "sulfonic acid/carboxylic acid copolymer"). The copolymer of a sulfonic acid and a carboxylic acid contains a constituent unit derived from a monomer having a sulfonic acid group, and a constituent unit derived from a monomer having a carboxylic acid group.

In an embodiment of the present invention, an example of the monomer having a sulfonic acid group includes a polyalkylene glycol-based monomer (A) described in paragraphs [0019] to [0036] of JP-A-2015-168770, a sulfonic acid group-containing monomer (C) described in paragraphs [0041] to [0054] of JP-A-2015-168770, or the like.

In an embodiment of the present invention, examples of the monomer having a carboxylic acid group include an acrylic acid, a methacrylic acid, a crotonic acid, an α-hydroxyacrylic acid, an α-hydroxymethylacrylic acid, and a metal salt thereof, and a salt of an ammonium salt, an organic amine salt, and the like.

In an embodiment of the present invention, a molar ratio of a constituent unit derived from a monomer having a sulfonic acid group to a constituent unit derived from a monomer having a carboxylic acid group in the sulfonic acid/carboxylic acid copolymer is preferably 5:95 to 95:5, more preferably 10:90 to 90:10, still more preferably 30:70 to 70:30, yet still more preferably 45:55 to 65:35, and most preferably 50:50 to 60:40.

In an embodiment of the present invention, a weight average molecular weight of the first water-soluble polymer is 1000 or more, 2000 or more, 3000 or more, 4000 or more, 5000 or more, 6000 or more, 6500 or more, 7000 or more, 8000 or more, 9000 or more, 9500 or more, 10000 or more, 15000 or more, or more than 15000, from a viewpoint of an adsorption rate of the first water-soluble polymer to the object to be polished (that is, easiness in adsorption of the first water-soluble polymer to the object to be polished). In an embodiment of the present invention, the weight average molecular weight of the first water-soluble polymer is 100000 or less, 30000 or less, 25000 or less, 20000 or less, 15000 or less, 10000 or less, 9500 or less, 9000 or less, 8000 or less, 7000 or less, 6500 or less, or less than 6500 from a viewpoint of a desorption rate of the first water-soluble polymer from the object to be polished (easiness in desorption of the first water-soluble polymer from the object to be polished later). In the present embodiment, in a viewpoint of increasing the polishing speed of the object to be polished containing a nitrogen-silicon bond and reducing the number of defects of the object to be polished containing an oxygen-silicon bond, the weight average molecular weight of the first water-soluble is preferably more than 15000, in a viewpoint of reducing the number of defects of the object to be polished containing a nitrogen-silicon bond, the weight average molecular weight of the first water-soluble is preferably less than 6500, and in a viewpoint of reducing the number of defects of the object to be polished containing a silicon-silicon bond, the weight average molecular weight of the first water-soluble is preferably 6500 to 15000.

In the present specification, the weight average molecular weight is measured by gel permeation chromatography (GPC) using polystyrene of which a molecular weight is known as a reference material.

In an embodiment of the present invention, a content of the first water-soluble polymer is preferably 0.001% by mass or more, 0.005% by mass or more, 0.05% by mass or more, or 0.08% by mass or more, and may be 0.2% by mass or more, 0.4% by mass or more, 0.6% by mass or more, and 0.8% by mass or more, with respect to the total mass of the polishing composition. In an embodiment of the present invention, the content of the first water-soluble polymer is 10% by mass or less, 8% by mass or less, 6% by mass or less, 4% by mass or less, 2% by mass or less, 1.9% by mass or less, 1.8% by mass or less, 1.7% by mass or less, 1.6% by mass or less, 1.5% by mass or less, 1.4% by mass or less, 1.3% by mass or less, 1.2% by mass or less, 1.1% by mass or less, 1.0% by mass or less, 0.9% by mass or less, 0.8% by mass or less, 0.7% by mass or less, 0.6% by mass or less, 0.5% by mass or less, 0.4% by mass or less, 0.3% by mass or less, or 0.2% by mass or less. According to an embodiment of the present invention, even in a case where the amount of first water-soluble polymer added is decreased, the effect of the present invention can be efficiently achieved by a complementary cooperative action between the second water-soluble polymer and the nonionic surfactant.

In an embodiment of the present invention, the first water-soluble polymer may be a homopolymer and may be a copolymer. In a case where the first water-soluble polymer is a copolymer, a form thereof may be any of a block copolymer, a random copolymer, a graft copolymer, and an alternating copolymer.

In an embodiment of the present invention, the first water-soluble polymer is at least one selected from the group consisting of a polystyrene sulfonic acid, a (co)polymer containing a constituent unit derived from a polystyrene sulfonic acid as a part of a structure, a copolymer of a sulfonic acid and a carboxylic acid, sulfonated polysulfone, and a polyaniline acid. Such an embodiment can efficiently achieve a desired effect of the present invention.

(Second Water-Soluble Polymer)

In an embodiment of the present invention, the polishing composition contains a second water-soluble polymer different from the first water-soluble polymer. Here, it should be noted that as long as a second water-soluble polymer is different from the first water-soluble polymer, the second water-soluble polymer may has a sulfonic acid group or a group having a salt thereof, or a carboxyl group or a group having a salt thereof.

In an embodiment of the present invention, the second water-soluble polymer contains a constituent unit represented by the following Formula (2):

[Formula 7]

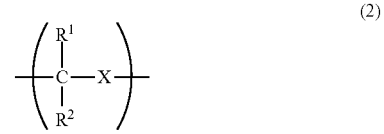

X is represented by the following formula:

[Formula 8]

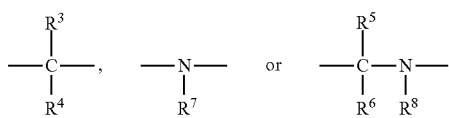

$R^1$ to $R^6$ each independently are a hydrogen atom or -J, and -J is a hydroxyl group, a sulfonic acid group or a group of a salt thereof,

[Formula 9]

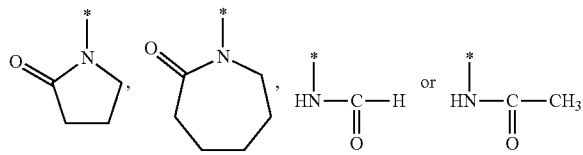

where * represents a bonding position, $R^7$ and $R^8$ each independently are a hydrogen atom or -E, and -E is represented by the following formula:

[Formula 10]

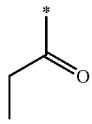

where * represents a bonding position, and the constituent unit includes at least one of -J and -E. Such an embodiment can efficiently achieve a desired effect of the present invention.

In an embodiment of the present invention, X is represented by the following formula:

[Formula 11]

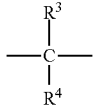

at least one of $R^1$ to $R^4$ is -J, and -J is preferably a hydroxyl group, a sulfonic acid group or a group of a salt thereof, or the following:

[Formula 12]

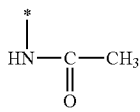

In an embodiment of the present invention, X is represented by the following formula:

[Formula 13]

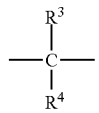

at least one of $R^1$ to $R^4$ is -J, and -J is preferably the following:

[Formula 14]

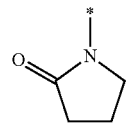

In an embodiment of the present invention, X is represented by the following formula:

[Formula 15]

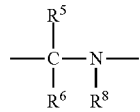

at least one of $R^1$, $R^2$, $R^5$, and $R^6$ is a hydrogen atom, $R^8$ is -E, and -E is preferably represented by the following formula:

[Formula 16]

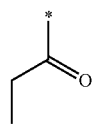

In an embodiment of the present invention, a weight average molecular weight of the second water-soluble polymer is 5000 or more, 10000 or more, 15000 or more, 20000 or more, or 25000 or more, from a viewpoint of reducing scratches or the number of defects. In an embodiment of the present invention, the weight average molecular weight of the second water-soluble polymer is 60000 or less, 50000 or less, 40000 or less, less than 30000, 35000 or less, 20000 or less, 15000 or less, or 12000 or less, from a viewpoint of reducing the number of defects after polishing. According to an embodiment of the present invention, even in a case where the weight average molecular weight of the second water-soluble polymer is large, the effect of the present invention can be efficiently achieved by a complementary cooperative action between the first water-soluble polymer and the nonionic surfactant.

In an embodiment of the present invention, in a case where the second water-soluble polymer is a (co)polymer containing polyvinyl alcohol (PVA) or a constituent unit derived from polyvinyl alcohol (PVA) as a part of a structure, a molecular weight of the weight average molecular weight is less than 30000, 20000 or less, 15000 or less, and 12000 or less in the preferred order. In addition, in a case where the weight average molecular weight of the second water-soluble polymer is 15000 or less, it is preferable to use polypropylene glycol as a surfactant in consideration of the reduction of the number of defects of SiN.

In an embodiment of the present invention, a content of the second water-soluble polymer is preferably 0.001% by mass or more, 0.005% by mass or more, 0.05% by mass or more, 0.08% by mass or more, 0.2% by mass or more, 0.4% by mass or more, 0.6% by mass or more, or 0.8% by mass or more, with respect to the total mass of the polishing composition. Such an embodiment can efficiently achieve a desired effect of the present invention. In an embodiment of the present invention, the content of the second water-soluble polymer is 10% by mass or less, 8% by mass or less, 6% by mass or less, 4% by mass or less, 2% by mass or less, 1.9% by mass or less, 1.8% by mass or less, 1.7% by mass or less, 1.6% by mass or less, 1.5% by mass or less, 1.4% by mass or less, 1.3% by mass or less, 1.2% by mass or less, or 1.1% by mass or less, and may be 0.8% by mass or less, 0.6% by mass or less, 0.4% by mass or less, or 0.3% by mass or less. According to an embodiment of the present invention, in a case in which the amount of second water-soluble polymer is decreased, the effect of the present invention can be efficiently exerted, particularly on the object to be polished containing an oxygen-silicon bond and the object to be polished containing a nitrogen-silicon bond by the complementary cooperative action between the first water-soluble polymer and the nonionic surfactant.

In an embodiment of the present invention, the second water-soluble polymer may be a homopolymer and may be a copolymer. In a case where the first water-soluble polymer is a copolymer, a form thereof may be any of a block copolymer, a random copolymer, a graft copolymer, and an alternating copolymer.

In an embodiment of the present invention, the second water-soluble polymer is at least one selected from the group consisting of polyvinyl alcohol (PVA), a (co)polymer containing a constituent unit derived from polyvinyl alcohol (PVA) as a part of a structure, poly-N-vinylacetamide, and a (co)polymer containing a constituent unit derived from poly-N-vinylacetamide as a part of a structure. Such an embodiment can efficiently achieve a desired effect of the present invention.

In addition, in an embodiment of the present invention, a saponification degree of the polyvinyl alcohol (PVA) or the (co)polymer containing a constituent unit derived from polyvinyl alcohol (PVA) as a part of a structure is preferably 90% or more.

In an embodiment of the present invention, at least one of the first water-soluble polymer and the second water-soluble polymer is a homopolymer. Such an embodiment has technical effects that defects in a silicon nitride film are particularly reduced.

In an embodiment of the present invention, the second water-soluble polymer has a sulfonic acid group or a group having a salt thereof. Not only the first water-soluble polymer and but also the second water-soluble polymer has a sulfonic acid group or a group having a salt thereof, such that a formation density of a protective film can be further increased by adsorbing of the first water-soluble polymer and the second water-soluble polymer to the surface of the object to be polished by a charge interaction, and the number of defects can be reduced because the protective film can function as an easily separable adhesion preventing film (in the present specification, simply referred to as "adhesion protective film") that prevents a defect causing material from being adhered to the surface of the object to be polished.

(pH of Polishing Composition)

In an embodiment of the present invention, a pH of the polishing composition is less than 9.0. In an embodiment of the present invention, the pH of the polishing composition is less than 8.0. In an embodiment of the present invention, the pH of the polishing composition is less than 7.0. In an embodiment of the present invention, the pH of the polishing composition is less than 6.0. In an embodiment of the present invention, the pH of the polishing composition is less than 5.0. In an embodiment of the present invention, the pH of the polishing composition is less than 4.5. In an embodiment of the present invention, the pH of the polishing composition is less than 4.0. In an embodiment of the present invention, the pH of the polishing composition is 3.9 or less, 3.7 or less, 3.5 or less, or 3.3 or less. In an embodiment of the present invention, the pH of the polishing composition is more than 1.0. In an embodiment of the present invention, the pH of the polishing composition is more than 1.5. In an embodiment of the present invention, the pH of the polishing composition is more than 2.0. In an embodiment of the present invention, the pH of the polishing composition is 2.1 or more. In an embodiment of the present invention, the pH of the polishing composition is 2.3 or more. In an embodiment of the present invention, the pH of the polishing composition is 2.5 or more. In an embodiment of the present invention, the pH of the polishing composition is 2.7 or more. In an embodiment of the present invention, the pH of the polishing composition is more than 2.0 and less than 5.0 and further is more than 2.0 and less than 4.0. Such an embodiment can efficiently achieve a desired effect of the present invention.

In an embodiment of the present invention, the polishing composition contains a pH adjusting agent. As the pH adjusting agent, a known acid, base, or salt thereof can be used. Specific examples of acid that can be used as the pH adjusting agent include inorganic acids such as hydrochloric acid, sulfuric acid, nitric acid, hydrofluoric acid, boric acid, carbonic acid, hypophosphorous acid, phosphorous acid, phosphoric acid, and the like; and organic acids such as formic acid, acetic acid, propionic acid, butyric acid, pentanoic acid, 2-methylbutyric acid, hexanoic acid, 3,3-dimethylbutyric acid, 2-ethylbutyric acid, 4-methylpentanoic acid, heptanoic acid, 2-methylhexanoic acid, octanoic acid, 2-ethylhexanoic acid, benzoic acid, hydroxyacetic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furan carboxylic acid, 2,5-furan dicarboxylic acid, 3-furan carboxylic acid, 2-tetrahydrofuran carboxylic acid, methoxy acetic acid, methoxy phenyl acetic acid, phenoxy acetic acid, and the like. However, the present invention is characterized in that the polishing composition contains the first water-soluble polymer having a sulfonic acid group or a group having a salt thereof, or a carboxyl group or a group having a salt thereof. Therefore, according to an embodiment of the present invention, acid as the pH adjusting agent is only the first water-soluble polymer. By such an embodiment, it is possible to promote the formation of the protective film by the first water-soluble polymer on the surface of the object to be polished by the charge interaction, and the number of defects can be reduced because the protective film can function as an easily separable adhesion preventing film that prevents a defect causing material from being adhered to the surface of the object to be polished.

In addition, in a case where the second water-soluble polymer has a sulfonic acid group or a group having a salt thereof, acid as the pH adjusting agent is only the first water-soluble polymer and the second water-soluble polymer. By such an embodiment, it is possible to promote the formation of the protective film by the first water-soluble polymer and the second water-soluble polymer on the surface of the object to be polished by the charge interaction, and the number of defects can be reduced because the protective film can function as an easily separable adhesion preventing film that prevents a defect causing material from being adhered to the surface of the object to be polished. In an embodiment of the present invention, such an effect can be particularly exerted on a Si-based material (specifically, a general material containing a silicon element such as silicon oxide, polycrystalline silicon, silicon nitride, or the like) as the object to be polished.

Examples of the base that can be used as the pH adjusting agent include amines such as aliphatic amine, aromatic amine, and the like, organic bases such as an ammonium solution, quaternary ammonium hydroxide, and the like, hydroxides of alkali metals such as potassium hydroxide and the like, hydroxide of a group 2 element, amino acids such as histidine and the like, ammonia, and the like. The pH adjusting agent may be used alone or in combination of two or more kinds thereof. The amount of pH adjusting agent added is not particularly limited, and may be adequately adjusted so that the polishing composition has a desired pH.

(Nonionic Surfactant)

In an embodiment of the present invention, the polishing composition contains a nonionic surfactant.

In an embodiment of the present invention, the nonionic surfactant is a polymer, and a weight average molecular weight thereof is preferably 50 or more, more preferably 100 or more, and still more preferably 200 or more. Such an embodiment can efficiently achieve a desired effect of the present invention. In an embodiment of the present invention, the nonionic surfactant is a polymer, and the weight average molecular weight thereof is preferably 10000 or less, more preferably 5000 or less, and still more preferably 1000 or less. Such an embodiment can efficiently achieve a desired effect of the present invention.

In an embodiment of the present invention, the nonionic surfactant has a glycerin structure and an alkyl group having 4 or more carbon atoms. In an embodiment of the present invention, the nonionic surfactant has a glycerin structure and one alkyl group having 4 or more carbon atoms. In an embodiment of the present invention, the number of carbon atoms of the alkyl group is preferably 6 or more, more preferably 8 or more, and still more preferably 10 or more. By such an embodiment, the nonionic surfactant can be selectively adsorbed on a surface made of a Si-based material, and a desired effect of the present invention is thus efficiently achieved. In an embodiment of the present invention, the number of carbon atoms of the alkyl group is preferably 18 or less, more preferably 16 or less, and still more preferably 14 or less. Such an embodiment has a technical effect that the nonionic surfactant is adsorbed on the surface made of the Si-based material and easily desorbed later (for example, at the time of cleaning or rinsing).

In an embodiment of the present invention, a density of a primary hydroxyl group in the nonionic surfactant is 50% or more. More plainly speaking, the density of the primary hydroxyl group in all hydroxyl groups in the nonionic surfactant (for example, polyglycerin surfactant) is 50% or more. In a case where the density of the primary hydroxyl group in the nonionic surfactant is less than 50%, the nonionic surfactant is unlikely to be adsorbed on the surface made of the Si-based material. According to the present embodiment, the density of the primary hydroxyl group is preferably 60% or more, more preferably 65% or more, still more preferably 70% or more, and yet still more preferably 75% or more. Such an embodiment has a technical effect that the nonionic surfactant is easily adsorbed on the surface made of the Si-based material. According to the present embodiment, the density of the primary hydroxyl group is preferably 99% or less, more preferably 95% or less, still more preferably 92% or less, and yet still more preferably 90% or less.

A method of adjusting a density of a primary hydroxyl group in the nonionic surfactant to the above numerical value is not particularly limited, and for example, a method disclosed in JP-A-2006-346526 and the like may be used. In JP-A-2006-346526, although polyglycerin lauryl ester is disclosed, regarding knowledge of adjusting the density of the primary hydroxyl group to the above numerical value, another polyol-based nonionic surfactant (for example, polyglycerin lauryl ether) can also be used. A ratio between a primary hydroxyl group and a secondary hydroxyl group can be obtained by spectrum analysis as in a nuclear magnetic resonance apparatus disclosed in [0018] of JP-A-2006-346526. In addition, the density of the primary hydroxyl group can be adjusted to the above numerical value with reference to adequate combinations of technologies disclosed in JP-A-2013-181169, JP-A-2014-074175, JP-A-2019-026822, and JP-A-2011-007588.

In an embodiment of the present invention, as described above, the nonionic surfactant is preferably polypropylene glycol, polyglycerin, polyglycerin alkyl ester, dextrin, a dextrin derivative, and the like, and particularly preferably polypropylene glycol, rather than polyglycerin alkyl ether having a glycerin structure and an alkyl group having 4 or more carbon atoms.

In an embodiment of the present invention, the nonionic surfactant is polyglycerin alkyl ether and a weight average molecular weight thereof is 500 or more. In a case where polyglycerin alkyl ether having a weight average molecular weight of less than 500 is used, the adhesion protective film for preventing a defect causing material is unlikely to be formed on the surface of the object to be polished. According to the present embodiment, the weight average molecular weight of the nonionic surfactant is preferably 750 or more, more preferably 1250 or more, and still more preferably 1500 or more. Such an embodiment has technical effects that an adsorption rate at the time of forming the adhesion protective film for preventing the defect causing material is fast and desorption is easy at the time of cleaning or rinsing.

According to the present embodiment, the weight average molecular weight of the nonionic surfactant may also be 2500 or less. Such an embodiment of the present invention has technical effects that the nonionic surfactant is adsorbed on the surface of the object to be polished and can form the adhesion protective film for preventing the defect causing material.

In an embodiment of the present invention, polypropylene glycol may be a monool type polypropylene glycol, a diol type polypropylene glycol, a triol type polypropylene glycol, and a mixture thereof. Among them, a diol type polypropylene glycol is preferable. In Examples also, a diol type polypropylene glycol is used.

In a case where polyethylene glycol (PEG) is used instead of polypropylene glycol (PPG), the surface roughness may deteriorate.

In an embodiment of the present invention, a weight average molecular weight of the polypropylene glycol is preferably 200 or more, more preferably 300 or more, and still more preferably 400 or more. According to such an embodiment, a desired effect of the present invention can be efficiently achieved. According to an embodiment of the present invention, the weight average molecular weight of the polypropylene glycol is preferably 10000 or less, more preferably 5000 or less, and still more preferably 2000 or less. According to such an embodiment, a desired effect of the present invention can be efficiently achieved by increasing a solubility of polypropylene glycol.

In an embodiment of the present invention, a content of the nonionic surfactant is preferably 0.001% by mass or more, 0.005% by mass or more, 0.05% by mass or more, 0.08% by mass or more, 0.2% by mass or more, 0.4% by mass or more, 0.6% by mass or more, or 0.8% by mass or more, with respect to the total mass of the polishing composition.

In an embodiment of the present invention, the content of the nonionic surfactant is 10% by mass or less, 8% by mass or less, 6% by mass or less, 4% by mass or less, 2% by mass or less, 1.9% by mass or less, 1.8% by mass or less, 1.7% by mass or less, 1.6% by mass or less, 1.5% by mass or less, 1.4% by mass or less, 1.3% by mass or less, 1.2% by mass or less, or 1.1% by mass or less. In the present embodiment, in a case where the nonionic surfactant is polyglycerin alkyl ether, a content of polyglycerin alkyl ether is 0.6% by mass or more or 0.8% by mass or more. Thereby, the number of defects of the object to be polished containing an oxygen-silicon bond or the object to be polished containing a silicon-silicon bond can be further reduced. It should be noted that, regarding an upper limit of the content of the nonionic surfactant, the above description can be applied.

In an embodiment of the present invention, the weight average molecular weights of the first water-soluble polymer, the second water-soluble polymer, and the nonionic surfactant are 3000 or more; 5000 or more; and 200, 300, 400, or 500 or more; respectively. In case where all of the three kinds of compounds contained in the polishing composition are polymers each having the lower limit molecular weight as indicated in the embodiment, the adhesion protective film for preventing a defect causing material is easily formed on the object to be polished, resulting in a technical effect that a desired effect of the present invention is efficiently achieved. In the present embodiment, the description described above is applied to the upper limits of the weight average molecular weights of the first water-soluble polymer, the second water-soluble polymer, and the nonionic surfactant.

In an embodiment of the present invention, the nonionic surfactant is not an amino type nonionic surfactant.

(Aqueous Carrier)

The polishing composition according to an embodiment of the present invention generally contains an aqueous carrier. The aqueous carrier has a function of dispersing or dissolving the respective components. It is more preferable that the aqueous carrier be only water. In addition, the aqueous carrier may be a mixed solvent of water and an organic solvent in order to disperse or dissolve the respective components.

It is preferable that water do not contain impurities as much as possible, from a viewpoint of inhibiting contamination of the object to be polished or an action of other components. For example, it is preferable that water have a total content of transition metal ions of 100 ppb or less. Here, the purity of water can be increased by, for example, a removal of impurity ions using an ion exchange resin, a removal of foreign substances by a filter, and an operation such as distillation. Specifically, it is preferable to use, for example, deionized water (ion exchange water), pure water, ultrapure water, distilled water, and the like, as water.

(Other Additives)

The polishing composition according to an embodiment of the present invention may also contain other additives at an arbitrary ratio within a range in which the effect of the present invention is not impaired, if necessary. Examples of the other additives include an antiseptic agent, a dissolved gas, a reducing agent, an oxidizing agent, and the like.

In an embodiment of the present invention, the polishing composition does not contain at least one selected from the group consisting of polyethylene glycol, polyoxyethylene nonylphenyl ether, polyglycerin, and polyoxyethylene lauryl sulfate.

In an embodiment of the present invention, the polishing composition does not contain polyvinyl acetal.

In an embodiment of the present invention, the polishing composition does not contain a polymer containing a constituent unit derived from hydroxyethyl acrylamide.

In an embodiment of the present invention, the polishing composition does not contain a modified polyvinyl alcohol polymer containing an alkyleneoxy group.

In an embodiment of the present invention, the polishing composition does not contain a polymer containing a constituent unit derived from (meth)acrylic acid amide.

EXAMPLES

The present invention is described in more detail with reference to the following Examples and Comparative Examples. However, the technical scope of the present invention is not limited to only the following Examples. Unless otherwise specified, "%" and "part(s)" refer to "% by mass" and "part(s) by mass", respectively. In addition, in the following Examples, unless otherwise specified, operations were carried out under a condition of room temperature (25° C.)/relative humidity of 40 to 50% RH.

[Preparation of Polishing Composition]

As shown in Table 1, an abrasive grain (sulfonic acid immobilized colloidal silica, average primary particle size: 35 nm, average secondary particle size: 70 nm, D90/D10: 1.7, aspect ratio: 1.2); a first water-soluble polymer; a second water-soluble polymer; a surfactant; and a liquid carrier (pure water); and in some Examples and Comparative Examples ammonia were added, stirred and mixed so that respective polishing compositions having compositions and pHs shown in Table 1 were prepared (mixing temperature: about 25° C., mixing time: about 10 minutes). All the densities of primary hydroxyl groups in polyglycerin lauryl ether and polyglycerin lauryl ester used in Examples and Comparative Examples were 75% to 85%. In addition, the saponification degrees of polyvinyl alcohol and sulfonic acid-modified polyvinyl alcohol used in Examples and Comparative Examples were 100% and 99%, respectively.

[Average Primary Particle Size of Abrasive Grain]

An average primary particle size of the abrasive grains was calculated from a specific surface area of the abrasive grain by a BET method measured using "Flow Sorb II 2300" manufactured by Micromeritics Instruments Corporation and a density of the abrasive grains.

[Average Secondary Particle Size of Abrasive Grain]

An average secondary particle size of the abrasive grains was calculated by a dynamic light scattering method measured using "UPA-UT151" manufactured by Microtrac.

[Aspect Ratio of Abrasive Grain]

As an aspect ratio of the abrasive grain, an average value of values obtained by randomly extracting 300 abrasive grain images measured by FE-SEM and measuring an aspect ratio thereof (long diameter/short diameter) was used.

[pH of Polishing Composition]

A pH of the polishing composition was determined by measuring a value obtained by correcting three points by using standard buffer solutions (pH of phthalate pH buffer solution: 4.01 (25° C.), pH of neutral phosphate pH buffer solution: 6.86 (25° C.), and pH of carbonate pH buffer solution: 10.01 (25° C.)), adding a glass electrode to the polishing composition, and stabilizing the polishing composition after 2 minutes or longer, with a glass electrode type hydrogen ion concentration indicator (model: F-23, manufactured by HORIBA, Ltd.). The results are shown in Table 1.

[Polishing Test]

In the respective Examples and the respective Comparative Examples, a silicon oxide film having a thickness of 1000 Å, a silicon nitride film having a thickness of 1000 Å, and a polysilicon film having a thickness of 1000 Å were formed on a surface of each of silicon wafers (300 mm, blanket wafer) and these structures were used as an object to be polished (in Table, indicated as $SiO_2$, SiN, and Poly-Si). The silicon oxide film is formed of tetraethyl orthosilicate (TEOS). A coupon obtained by cutting each object to be polished into a 60 mm×60 mm chip was used as a test piece, and was polished under the following conditions.

(Polishing Apparatus and Polishing Condition)

Polishing apparatus: wrapping machine EJ-380IN-CH manufactured by Engis Japan Corporation Polishing pressure: 1.5 psi (=10.3 kPa)

Pad: rigid polyurethane pad IC1010 manufactured by Nitta Hass Incorporated

Platen rotation speed: 83 rpm

Carrier rotation speed: 77 rpm

Supply of polishing composition: pouring and flowing

Polishing composition supply amount: 200 ml/min Polishing time: 20 seconds (Measurement of Polishing Speed)

A thickness (film thickness) of the test piece before and after polishing was measured by an optical film thickness meter (ASET-f5x, manufactured by KLA-Tencor Corporation). A difference between the thickness (film thickness) of the test piece after polishing and the thickness of the test piece before polishing was obtained, the obtained value was divided by the polishing time, and then a unit was adjusted, thereby calculating a polishing speed (Å/min.). The results are shown in the following table. Note that 1 Å is 0.1 nm.

(Measurement of Number of Defects)

The number of defects of 0.13 μm or more in the polished test piece was measured. The number of defects was measured by using a wafer defect detecting apparatus SP-2 manufactured by KLA-Tencor Corporation. The measurement was performed on the remaining portion at which a portion having a width of 5 mm (portion from width of 0 mm to width of 5 mm when an outer peripheral is 0 mm) was removed from an outer peripheral end of one side of the polished test piece. As the number of defects is reduced, scratches, roughness, and the number of residues on the surface are reduced, which means that a disturbance of the surface is reduced.

(Measurement of Surface Roughness)

A surface roughness (Ra) of the polished test piece was measured using a scanning type probe microscope (SPM). The Ra was measured using NANO-NAVI2 manufactured by Hitachi High-Technologies Corporation. SI-DF40P2 was used as a cantilever. The measurement was performed 3 times at a scanning frequency of 0.86 Hz, X of 512 pt, and Y of 512 pt, and an average value of the thus obtained values was used as a surface roughness (Ra). Note that a scanning range of SPM is a square area of 2 μm×2 μm.

TABLE 1

| | Abrasive grain | | | First water-soluble polymer | | | Second water-soluble polymer | | | Surfactant | | | |
|---|---|---|---|---|---|---|---|---|---|---|---|---|---|
| | Type | Secondary particle size | Aspect ratio | Concentration [wt %] | Type | Molecular weight | Concentration [wt %] | Type | Molecular weight | Concentration [wt %] | Type | Molecular weight | Concentration [wt %] | pH |
| Example 1 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 0.1 | 3 |
| Example 2 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 0.1 | 2 |
| Example 3 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 0.1 | 5 |
| Example 4 | Sulfonic acid immobilized silica | 70 | 1.2 | 0.5 | Polystyrene sulfonic acid | 10000 | 1 | Polyvinyl alcohol | 30000 | 1 | Polyglycerin lauryl ether | 2000 | 0.1 | 3 |
| Example 5 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 0.1 | 3 |
| Example 6 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 1 | 3 |
| Example 7 | Sulfonic acid immobilized silica | 70 | 1.2 | 0.5 | Polystyrene sulfonic acid | 10000 | 1 | Polyvinyl alcohol | 30000 | 1 | Polyglycerin lauryl ether | 2000 | 1 | 3 |
| Example 8 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 1000 | 0.1 | 3 |
| Example 9 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 4000 | 0.1 | 3 |
| Example 10 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 6000 | 0.1 | 3 |
| Example 11 | Sulfonic acid immobilized silica | 70 | 1.2 | 0.5 | Polystyrene sulfonic acid | 10000 | 0.1 | Polyvinyl alcohol | 30000 | 0.1 | Polyglycerin lauryl ether | 2000 | 0.1 | 3 |
| Example 12 | Sulfonic acid immobilized silica | 70 | 1.2 | 0.5 | Polystyrene sulfonic acid | 6000 | 0.1 | Polyvinyl alcohol | 30000 | 0.1 | Polyglycerin lauryl ester | 2000 | 0.1 | 3 |
| Example 13 | Sulfonic acid immobilized silica | 70 | 1.2 | 0.5 | Polystyrene sulfonic acid | 20000 | 0.1 | Polyvinyl alcohol | 30000 | 0.1 | Polyglycerin lauryl ether | 2000 | 0.1 | 3 |
| Example 14 | Sulfonic acid immobilized silica | 70 | 1.2 | 0.5 | Polystyrene sulfonic acid | 10000 | 0.1 | Polyvinyl alcohol | 10000 | 0.1 | Polyglycerin lauryl ether | 2000 | 0.1 | 3 |
| Example 15 | Sulfonic acid immobilized silica | 70 | 1.2 | 0.5 | Polystyrene sulfonic acid | 10000 | 0.1 | Poly-N-vinylacetamide | 30000 | 0.1 | Polyglycerin lauryl ether | 2000 | 0.1 | 3 |
| Example 16 | Sulfonic acid immobilized silica | 70 | 1.2 | 0.5 | Polystyrene sulfonic acid | 10000 | 0.1 | Sulfonic acid-modified polyvinyl alcohol | 30000 | 0.1 | Polyglycerin lauryl ether | 2000 | 0.1 | 3 |
| Example 17 | Sulfonic acid immobilized silica | 70 | 1.2 | 0.5 | Copolymer of sulfonic acid and caboxylic acid (sulfonic acid:caboxylic acid = 1:1) | 10000 | 0.1 | Polyvinyl alcohol | 30000 | 0.1 | Polyglycerin lauryl ether | 2000 | 0.1 | 3 |

TABLE 1-continued

| | Abrasive grain | | | First water-soluble polymer | | | Second water-soluble polymer | | | Surfactant | | | pH |
|---|---|---|---|---|---|---|---|---|---|---|---|---|---|
| | Type | Secondary particle size | Aspect ratio | Concentration [wt %] | Type | Molecular weight | Concentration [wt %] | Type | Molecular weight | Concentration [wt %] | Type | Molecular weight | Concentration [wt %] | |
| Example 18 | Sulfonic acid immobilized silica | 70 | 1.2 | 0.5 | Copolymer of sulfonic acid and caboxylic acid (sulfonic acid:caboxylic acid = 8:2) | 10000 | 0.1 | Polyvinyl alcohol | 30000 | 0.1 | Polyglycerin lauryl ether | 2000 | 0.1 | 3 |
| Example 19 | Sulfonic acid immobilized silica | 70 | 1.2 | 0.5 | Copolymer of sulfonic acid and caboxylic acid (sulfonic acid:caboxylic acid = 2:8) | 10000 | 0.1 | Polyvinyl alcohol | 30000 | 0.1 | Polyglycerin lauryl ether | 2000 | 0.1 | 3 |
| Example 20 | Sulfonic acid immobilized silica | 70 | 1.2 | 1 | Polystyrene sulfonic acid | 10000 | 0.1 | Polyvinyl alcohol | 30000 | 0.1 | Polyglycerin lauryl ether | 2000 | 0.1 | 3 |
| Example 21 | Sulfonic acid immobilized silica | 70 | 1.2 | 5 | Polystyrene sulfonic acid | 10000 | 0.1 | Polyvinyl alcohol | 30000 | 0.1 | Polyglycerin lauryl ether | 2000 | 0.1 | 3 |
| Example 22 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 200 | 0.1 | 3 |
| Example 23 | Sulfonic acid immobilized silica | 70 | 1.2 | 0.5 | Polystyrene sulfonic acid | 10000 | 0.1 | Polyvinyl alcohol | 10000 | 0.05 | Polypropylene glycol | 400 | 0.05 | 3 |
| Example 24 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 400 | 0.1 | 3 |
| Example 25 | Sulfonic acid immobilized silica | 70 | 1.2 | 0.5 | Polystyrene sulfonic acid | 10000 | 0.1 | Polyvinyl alcohol | 10000 | 0.2 | Polypropylene glycol | 400 | 0.1 | 3 |
| Example 26 | Sulfonic acid immobilized silica | 70 | 1.2 | 0.5 | Polystyrene sulfonic acid | 10000 | 0.1 | Polyvinyl alcohol | 10000 | 0.3 | Polypropylene glycol | 400 | 0.1 | 2 |
| Example 27 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 400 | 0.2 | 3 |
| Example 28 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 400 | 0.1 | 3 |
| Example 29 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 700 | 0.1 | 3 |
| Example 30 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 2000 | 0.1 | 3 |
| Example 31 | Sulfonic acid immobilized silica | 70 | 1.2 | 0.5 | Polystyrene sulfonic acid | 10000 | 0.1 | Polyvinyl alcohol | 30000 | 0.1 | Polypropylene glycol | 400 | 0.1 | 3 |
| Example 32 | Sulfonic acid immobilized silica | 70 | 1.2 | 5 | Polystyrene sulfonic acid | 10000 | 0.1 | Polyvinyl alcohol | 8000 | 0.1 | Polypropylene glycol | 400 | 0.1 | 3 |
| Example 33 | Sulfonic acid immobilized silica | 70 | 1.2 | 0.5 | Polystyrene sulfonic acid | 10000 | 0.1 | Polyvinyl alcohol | 5000 | 0.1 | Polypropylene glycol | 400 | 0.1 | 3 |
| Example 34 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 400 | 0.1 | 3 |
| Example 35 | Sulfonic acid immobilized silica | 70 | 1.2 | 0.5 | Polystyrene sulfonic acid | 10000 | 0.1 | Polyvinyl alcohol | 10000 | 0.1 | Polypropylene glycol | 400 | 0.1 | 3 |
| Example 36 | Sulfonic acid immobilized silica | 70 | 1.2 | 0.5 | Sulfonated polysulfone | 10000 | 0.1 | Polyvinyl alcohol | 10000 | 0.1 | Polypropylene glycol | 400 | 0.1 | 3 |

TABLE 1-continued

| | Abrasive grain | | | Concentration [wt %] | First water-soluble polymer | | | Second water-soluble polymer | | | Surfactant | | | pH |
|---|---|---|---|---|---|---|---|---|---|---|---|---|---|---|
| | Type | Secondary particle size | Aspect ratio | | Type | Molecular weight | Concentration [wt %] | Type | Molecular weight | Concentration [wt %] | Type | Molecular weight | Concentration [wt %] | |
| Example 37 | Sulfonic acid immobilized silica | 70 | 1.2 | 0.5 | Polyaniline sulfonic acid | 10000 | 0.1 | | | | Polypropylene glycol | 400 | 0.1 | 3 |
| Comparative Example 1 | Sulfonic acid immobilized silica | 70 | 1.2 | 0.5 | | | | | | | | | | 3 |
| Comparative Example 2 | Sulfonic acid immobilized silica | 70 | 1.2 | 0.5 | | | | Polyvinyl alcohol | 30000 | 0.1 | | | | 3 |
| Comparative Example 3 | Sulfonic acid immobilized silica | 70 | 1.2 | 0.5 | | | | | | | Polyglycerin lauryl ether | 2000 | 0.1 | 3 |
| Comparative Example 4 | Sulfonic acid immobilized silica | 70 | 1.2 | 0.5 | | | | Polyvinyl alcohol | 30000 | 0.1 | Polyglycerin lauryl ether | 2000 | 0.1 | 3 |
| Comparative Example 5 | Sulfonic acid immobilized silica | 70 | 1.2 | 0.5 | Polystyrene sulfonic acid | 10000 | 0.1 | | | | | | | 3 |
| Comparative Example 6 | Sulfonic acid immobilized silica | 70 | 1.2 | 0.5 | Polystyrene sulfonic acid | 10000 | 0.1 | | | | Polypropylene glycol | 400 | 0.1 | 3 |
| Comparative Example 7 | Sulfonic acid immobilized silica | 70 | 1.2 | 0.5 | | | | Polyvinyl alcohol | 10000 | 0.1 | Polypropylene glycol | 400 | 0.1 | 3 |
| Comparative Example 8 | Sulfonic acid immobilized silica | 70 | 1.2 | 0.5 | Polystyrene sulfonic acid | 10000 | 0.1 | Polyvinyl alcohol | 30000 | 0.1 | | | | 3 |
| Comparative Example 9 | Sulfonic acid immobilized silica | 70 | 1.2 | 0.5 | Polypropylene glycol | 700 | 0.1 | Polyvinyl alcohol | 10000 | 0.1 | Polyglycerin lauryl ether | 2000 | 0.1 | 3 |
| Comparative Example 10 | Sulfonic acid immobilized silica | 70 | 1.2 | 0 | Polystyrene sulfonic acid | 10000 | 0.1 | Polyvinyl alcohol | 30000 | 0.1 | Polyglycerin lauryl ether | 2000 | 0.1 | 3 |

TABLE 2

| | Polishing speed [Å/min.] | | | Number of defects [pieces] | | | Surface roughness: Ra [nm] 2 μm × 2 μm | | |
|---|---|---|---|---|---|---|---|---|---|
| | SiO₂ | SiN | Poly-Si | SiO₂ | SiN | Poly-Si | SiO₂ | SiN | Poly-Si |
| Example 1 | 31 | 21 | 35 | 241 | 106 | 740 | 0.5 | 0.4 | 0.5 |
| Example 2 | 35 | 24 | 33 | 245 | 98 | 768 | 0.5 | 0.4 | 0.5 |
| Example 3 | 32 | 22 | 35 | 251 | 178 | 801 | 0.5 | 0.4 | 0.5 |
| Example 4 | 31 | 18 | 35 | 239 | 92 | 738 | 0.5 | 0.4 | 0.5 |
| Example 5 | 32 | 21 | 37 | 240 | 105 | 701 | 0.5 | 0.4 | 0.5 |
| Example 6 | 31 | 21 | 31 | 201 | 106 | 737 | 0.5 | 0.4 | 0.5 |
| Example 7 | 32 | 21 | 37 | 201 | 98 | 702 | 0.5 | 0.4 | 0.5 |
| Example 8 | 31 | 21 | 35 | 224 | 105 | 735 | 0.5 | 0.4 | 0.5 |
| Example 9 | 31 | 21 | 35 | 199 | 103 | 741 | 0.5 | 0.4 | 0.5 |
| Example 10 | 32 | 21 | 35 | 187 | 104 | 739 | 0.5 | 0.4 | 0.5 |
| Example 11 | 32 | 21 | 35 | 241 | 97 | 744 | 0.5 | 0.4 | 0.5 |
| Example 12 | 32 | 18 | 35 | 238 | 114 | 746 | 0.5 | 0.4 | 0.5 |
| Example 13 | 32 | 17 | 35 | 237 | 137 | 768 | 0.5 | 0.4 | 0.5 |
| Example 14 | 31 | 21 | 35 | 238 | 108 | 698 | 0.5 | 0.4 | 0.5 |
| Example 15 | 31 | 21 | 35 | 235 | 104 | 678 | 0.5 | 0.4 | 0.5 |
| Example 16 | 32 | 21 | 35 | 233 | 108 | 621 | 0.5 | 0.4 | 0.5 |
| Example 17 | 31 | 20 | 35 | 240 | 98 | 744 | 0.5 | 0.4 | 0.5 |
| Example 18 | 32 | 20 | 35 | 244 | 102 | 740 | 0.5 | 0.4 | 0.5 |
| Example 19 | 32 | 20 | 35 | 231 | 110 | 741 | 0.5 | 0.4 | 0.5 |
| Example 20 | 37 | 22 | 35 | 245 | 102 | 741 | 0.5 | 0.4 | 0.5 |
| Example 21 | 45 | 24 | 35 | 242 | 104 | 744 | 0.5 | 0.4 | 0.5 |
| Example 22 | 31 | 21 | 37 | 233 | 108 | 742 | 0.5 | 0.4 | 0.5 |
| Example 23 | 31 | 21 | 38 | 237 | 11 | 751 | 0.5 | 0.4 | 0.5 |
| Example 24 | 31 | 21 | 34 | 223 | 111 | 786 | 0.5 | 0.4 | 0.5 |
| Example 25 | 31 | 21 | 37 | 211 | 108 | 711 | 0.5 | 0.4 | 0.5 |
| Example 26 | 31 | 21 | 38 | 214 | 110 | 735 | 0.5 | 0.4 | 0.5 |
| Example 27 | 31 | 21 | 39 | 213 | 111 | 733 | 0.5 | 0.4 | 0.5 |
| Example 28 | 31 | 21 | 34 | 211 | 105 | 741 | 0.5 | 0.4 | 0.5 |
| Example 29 | 31 | 21 | 31 | 220 | 112 | 740 | 0.5 | 0.4 | 0.5 |
| Example 30 | 31 | 21 | 34 | 210 | 125 | 741 | 0.5 | 0.4 | 0.5 |
| Example 31 | 31 | 21 | 32 | 218 | 121 | 744 | 0.5 | 0.4 | 0.5 |
| Example 32 | 37 | 21 | 41 | 214 | 109 | 745 | 0.5 | 0.4 | 0.5 |
| Example 33 | 31 | 21 | 37 | 241 | 114 | 751 | 0.5 | 0.4 | 0.5 |
| Example 34 | 31 | 21 | 31 | 210 | 108 | 730 | 0.5 | 0.4 | 0.5 |
| Example 35 | 31 | 21 | 29 | 205 | 110 | 721 | 0.5 | 0.4 | 0.5 |
| Example 36 | 37 | 23 | 37 | 351 | 414 | 842 | 0.5 | 0.4 | 0.5 |
| Example 37 | 36 | 27 | 37 | 350 | 510 | 842 | 0.5 | 0.4 | 0.5 |
| Comparative Example 1 | 32 | 134 | 45 | 2134 | 160000 | 5672 | 0.8 | 0.8 | 0.8 |
| Comparative Example 2 | 32 | 134 | 75 | 789 | 887 | 1001 | 1.1 | 1.4 | 0.7 |
| Comparative Example 3 | 31 | 134 | 45 | 703 | 814 | 989 | 0.8 | 1.5 | 1.2 |
| Comparative Example 4 | 32 | 132 | 39 | 734 | 160000 | 991 | 0.9 | 1.4 | 0.7 |
| Comparative Example 5 | 31 | 23 | 45 | 981 | 116 | 1031 | 1.1 | 1.0 | 1.3 |
| Comparative Example 6 | 31 | 23 | 37 | 711 | 118 | 1001 | 1.1 | 0.4 | 1.3 |
| Comparative Example 7 | 31 | 130 | 38 | 734 | 160000 | 781 | 0.9 | 1.0 | 0.6 |
| Comparative Example 8 | 31 | 23 | 75 | 742 | 115 | 801 | 1.1 | 1.1 | 0.8 |
| Comparative Example 9 | 31 | 131 | 35 | 531 | 1431 | 674 | 0.8 | 1.4 | 0.7 |
| Comparative Example 10 | 0 | 0 | 0 | 241 | 106 | 740 | 1.1 | 1.4 | 1.3 |

What is claimed is:

1. A polishing composition comprising:
an abrasive grain having an organic acid immobilized on a surface thereof;
a first water-soluble polymer having a sulfonic acid group or a group having a salt thereof, or a carboxyl group or a group having a salt thereof;
a second water-soluble polymer different from the first water-soluble polymer;
a nonionic surfactant, wherein the nonionic surfactant has a glycerin structure and an alkyl group having 4 or more carbon atoms; and
an aqueous carrier,
wherein the polishing composition is used for polishing an object to be polished.

2. The polishing composition according to claim 1, wherein a pH is less than 9.0.

3. The polishing composition according to claim 2, wherein the pH is less than 7.0.

4. The polishing composition according to claim 3, wherein the pH is less than 5.0.

5. The polishing composition according to claim 1, wherein a content of the abrasive grain is more than 0.01% by mass.

6. The polishing composition according to claim 1, wherein an average secondary particle size of the abrasive grain is less than 100 nm.

7. The polishing composition according to claim 1, wherein at least one of the first water-soluble polymer and the second water-soluble polymer is a homopolymer.

8. The polishing composition according to claim 1, wherein the first water-soluble polymer contains a constituent unit represented by
the following Formula (1):

[Formula 1]

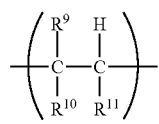
(1)

$R^9$ is a hydrogen atom or a methyl group, and
$R^{10}$ and $R^{11}$ each independently are a hydrogen atom, —COOR$^{12}$, or -G,
where $R^{10}$ and $R^{11}$ are not simultaneously hydrogen atoms, and
-G is a sulfonic acid group,

[Formula 2]

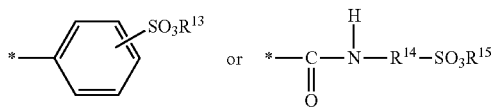

where * represents a bonding position,
$R^{12}$, $R^{13}$ and $R^{15}$ each independently are a hydrogen atom, an alkyl group having 1 to 12 carbon atoms, a hydroxyalkyl group having 1 to 12 carbon atoms, or a counter cation, and
$R^{14}$ is a divalent group.

9. The polishing composition according to claim 1, wherein the second water-soluble polymer contains a constituent unit represented by
the following Formula (2):

[Formula 3]

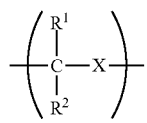
(2)

X is represented by the following formula:

[Formula 4]

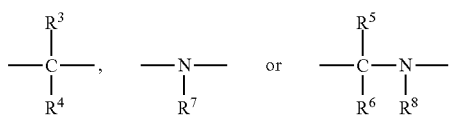

$R^1$ to $R^6$ each independently are a hydrogen atom or -J, and

-J is a hydroxyl group, a sulfonic acid group or a group of a salt thereof,

[Formula 5]

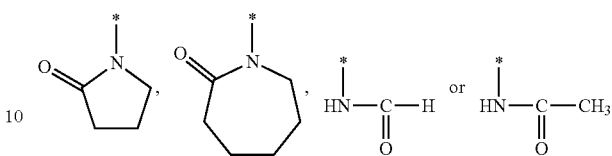

where * represents a bonding position,
$R^7$ and $R^8$ each independently are a hydrogen atom or -E, and
-E is represented by the following formula:

[Formula 6]

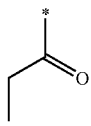

where * represents a bonding position, and
the constituent unit includes at least one of -J and -E.

10. The polishing composition according to claim 1, wherein the first water-soluble polymer is at least one selected from the group consisting of a polystyrene sulfonic acid, a (co)polymer containing a constituent unit derived from a polystyrene sulfonic acid as a part of a structure, a copolymer of a sulfonic acid and a carboxylic acid, sulfonated polysulfone, and a polyaniline acid.

11. The polishing composition according to claim 1, wherein the second water-soluble polymer is at least one selected from the group consisting of polyvinyl alcohol (PVA), a (co)polymer containing a constituent unit derived from polyvinyl alcohol (PVA) as a part of a structure, poly-N-vinylacetamide, and a (co)polymer containing a constituent unit derived from poly-N-vinylacetamide as a part of a structure.

12. The polishing composition according to claim 11, wherein a saponification degree of the polyvinyl alcohol (PVA) or the (co)polymer containing a constituent unit derived from polyvinyl alcohol (PVA) as a part of a structure is 90% or more.

13. The polishing composition according to claim 1, wherein the second water-soluble polymer has a sulfonic acid group or a group having a salt thereof.

14. The polishing composition according to claim 1, wherein the polishing composition is used for preliminary polishing.

15. The polishing composition according to claim 1, wherein the object to be polished contains a silicon-silicon bond, a nitrogen-silicon bond, or an oxygen-silicon bond.

16. The polishing composition according to claim 1, wherein weight average molecular weights of the first water-soluble polymer, the second water-soluble polymer, and the nonionic surfactant are 3000 or more, 5000 or more, and 200 or more, respectively.

17. The polishing composition according to claim 1, wherein the nonionic surfactant has a glycerin structure and an alkyl group having 10 or more carbon atoms.

18. The polishing composition according to claim 1, wherein the nonionic surfactant is a polyglycerin alkyl ether and a density of a primary hydroxyl group in the polyglycerin alkyl ether is 50% is more.

19. The polishing composition according to claim 1, wherein the nonionic surfactant is a polyglycerin alkyl ether having a weight average molecular weight of 500 or more.

20. The polishing composition according to claim 1, wherein the nonionic surfactant is a polyglycerin alkyl ether, and a content of the polyglycerin alkyl ether is 0.6% by mass or more.

21. A polishing composition, comprising:
   an abrasive grain having an organic acid immobilized on a surface thereof, wherein the abrasive grain is silica with an organic sulfonic acid immobilized on the surface thereof, has a average secondary particle size of 60 nm to 80 nm, and is present in the composition at a concentration of 0.005 wt.% to 10 wt.%;
   a first water-soluble polymer having a sulfonic acid group or a group having a salt thereof, wherein the first water-soluble polymer has molecular weight of 5,000 to 10,000 and is present in the composition at a concentration of 0.05 wt.% to 5 wt.%;
   polyvinyl alcohol, present in the composition at a concentration of 0.005 wt.% to 10 wt.% and having a molecular weight of 5,000 to 50,000;
   a nonionic surfactant, wherein the nonionic surfactant is polypropylene glycol present in the composition at a concentration of 0.005 wt.% to 10 wt.% and having a molecular weight of 200 to 5,000; and
   an aqueous carrier,
   wherein the polishing composition has a pH of more than 2.0 and less than 5.0.

22. A process of producing a semiconductor device, the process comprising polishing a surface comprising silicon oxide, silicon nitride, or poly-silicon according to the following steps:
   a preliminary polishing step;
   a bulk polishing step; and
   a buff polishing step,
   wherein the polishing composition according to claim 21 is used as a polishing composition in the preliminary polishing step.

23. A method of polishing a surface comprising silicon oxide, silicon nitride, or poly-silicon, the method comprising:
   polishing the surface using a polishing composition comprising:
      an abrasive grain having an organic acid immobilized on a surface thereof, 0 wherein the abrasive grain is silica with an organic sulfonic acid immobilized on the surface thereof, has an average secondary particle size of 60 nm to 80 nm, and is present in the composition at a concentration of 0.005 wt.% to 10 wt.%;
      a first water-soluble polymer having a sulfonic acid group or a group having a salt thereof, wherein the first water-soluble polymer has molecular weight of 5,000 to 10,000 and is present in the composition at a concentration of 0.05 wt.% to 5 wt.%;
      polyvinyl alcohol, present in the composition at a concentration of 0.005 wt.% to 10 wt.% and having a molecular weight of 5,000 to 50,000;
      a nonionic surfactant, wherein the nonionic surfactant is polypropylene glycol present in the composition at a concentration of 0.005 wt.% to 10 wt.% and having a molecular weight of 200 to 5,000; and
      an aqueous carrier,
      wherein the polishing composition has a pH of more than 2.0 and less than 5.0.

* * * * *